US008819848B2

(12) United States Patent
Moore (10) Patent No.: US 8,819,848 B2
(45) Date of Patent: Aug. 26, 2014

(54) METHOD FOR SCALABLE ACCESS CONTROL DECISIONS

(75) Inventor: Jonathan T. Moore, Philadelphia, PA (US)

(73) Assignee: Comcast Interactive Media, LLC, Philadelphia, PA (US)

(*) Notice: Subject to any disclaimer, the term of this patent is extended or adjusted under 35 U.S.C. 154(b) by 406 days.

(21) Appl. No.: 12/624,783

(22) Filed: Nov. 24, 2009

(65) Prior Publication Data
US 2011/0126296 A1 May 26, 2011

(51) Int. Cl.
*G06F 7/04* (2006.01)
*G06F 17/30* (2006.01)

(52) U.S. Cl.
USPC ............. 726/28; 380/200; 707/781; 725/109

(58) Field of Classification Search
USPC .................. 726/27, 28, 29, 30; 707/781, 782; 725/109, 112
See application file for complete search history.

(56) References Cited

U.S. PATENT DOCUMENTS

| 7,162,744 | B2 * | 1/2007 | Reasons et al. | 726/27 |
|---|---|---|---|---|
| 7,716,240 | B2 * | 5/2010 | Lim | 707/781 |
| 7,725,605 | B2 * | 5/2010 | Palmeri et al. | 709/246 |
| 7,774,363 | B2 * | 8/2010 | Lim | 707/781 |
| 7,949,677 | B2 * | 5/2011 | Croft et al. | 707/781 |
| 7,983,416 | B2 * | 7/2011 | Takashima et al. | 380/201 |
| 7,987,140 | B2 * | 7/2011 | Bellwood et al. | 705/59 |
| 8,095,991 | B2 * | 1/2012 | Bellwood et al. | 726/30 |
| 8,341,242 | B2 * | 12/2012 | Dillon et al. | 709/219 |
| 2003/0229900 | A1 * | 12/2003 | Reisman | 725/87 |
| 2004/0031058 | A1 * | 2/2004 | Reisman | 725/112 |
| 2005/0078668 | A1 * | 4/2005 | Wittenberg et al. | 370/389 |
| 2005/0132201 | A1 * | 6/2005 | Pitman et al. | 713/176 |
| 2006/0047814 | A1 | 3/2006 | Batz et al. | |
| 2006/0185021 | A1 | 8/2006 | Dujari et al. | |
| 2006/0224250 | A1 * | 10/2006 | Callaghan | 700/1 |
| 2007/0289004 | A1 * | 12/2007 | Chao et al. | 726/9 |
| 2008/0189774 | A1 * | 8/2008 | Ansari et al. | 726/7 |
| 2008/0307517 | A1 * | 12/2008 | Grigoriev et al. | 726/9 |
| 2009/0320073 | A1 * | 12/2009 | Reisman | 725/51 |
| 2010/0192210 | A1 * | 7/2010 | Purdy et al. | 726/7 |
| 2011/0219419 | A1 * | 9/2011 | Reisman | 725/112 |
| 2011/0276993 | A1 * | 11/2011 | Ferguson | 725/30 |
| 2012/0017000 | A1 * | 1/2012 | Lim | 709/229 |

OTHER PUBLICATIONS

European office action for application No. 10191562.7 mailed Jan. 24, 2012.
European Search Report for application No. 10191562.7 dated Apr. 29, 2011.

(Continued)

*Primary Examiner* — Fikremariam A Yalew
(74) *Attorney, Agent, or Firm* — Banner & Witcoff, Ltd.

(57) ABSTRACT

Content access may be provided and processed by assigning responsibility for obtaining entitlement data to the client's browser. Thus, in one example, the client may be configured to synchronize and coordinate data lookups associated with a content request, rather than relying on the server to do so. The network architecture may use a mediator design pattern, in which the client's browser acts as the mediator (i.e., middleman) between a content server and an entitlement data server. Accordingly, synchronous calls between server-side services might not be required. Instead, data necessary for the content server to process a client request for access to protected content may be received in the incoming request from the client's browser.

20 Claims, 9 Drawing Sheets

(56) References Cited

OTHER PUBLICATIONS

Ma et al, "Authentication Delegation for Subscription-Based Remote Network Services", Computers & Security, Elsevier Science Publishers, Amsterdam, NL, vol. 25, No. 5, Jul. 1, 2006, pp. 371-378.

Cranor et al, "Enhanced Streaming Services in a Content Distribution Network", IEEE Internet Computing, IEEE Service Center, New York, NY, Jul. 1, 2001, pp. 66-75.

* cited by examiner

```
<script>
var video_metadata='video_id=1234&provider=hbo&release_url=XXXXXXXXX&exp=
12345678&sig=YYYYYY';
<script>
```

METHOD FOR SCALABLE ACCESS CONTROL DECISIONS

TECHNICAL FIELD

Aspects described herein relate generally to accessing digital content. More specifically, aspects of the present disclosure relate to processing a user's request to access protected digital content based on entitlement data.

BACKGROUND

With significant technological advances made in the telecommunications industry over the last decade, communication companies have continually developed new and attractive ways to provide entertainment, information and communication services to customers in order to remain competitive in the market. For cable and other content service providers in particular, one such development has been the delivery of anytime, in-home access to digital content, commonly referred to as on-demand programming. Digital content or simply content may refer broadly to the information contained in a transmitted signal that provides value to an end-user/audience, and includes, for example, movies, television shows, news broadcasts, and other forms of media. With the advent of more sophisticated mobile telecommunication devices, viewing movies, television shows, news broadcasts, and other forms of media on-demand has become extremely popular. As a result, it has become increasingly burdensome to ensure that only users who are entitled to view certain protected digital content are able to gain access to such content.

When a client (e.g., subscriber to a content service provider, customer, service purchaser, user, etc.) makes a request for a particular item of digital content, the server hosting such content must make an access control determination based on the client's entitlement data (e.g., the user's subscription plan) and the content's metadata (attributes about the specific content requested, for example the title of a program (e.g., an episode name), copyright year, actors or actresses in a movie or show, length, content provider and the like) before the server grants the client access to the requested content. Entitlement data may be piece or pieces of data about a subscriber that inform a determination of his or her rights to access certain content items or types of content. Content metadata may be a piece or pieces of data about a piece of content that inform a determination of a subscriber's rights to access that content. Currently, client entitlement data and content metadata lookups are usually performed at the time of the request by the content server. With increasing demand for content, a content server may be overloaded with requests and require additional resources to obtain entitlement data and/or content metadata for each content request.

BRIEF SUMMARY

The following presents a simplified summary of the disclosure in order to provide a basic understanding of some aspects herein that allow for rendering access control decisions when a client (e.g., client, customer, service purchaser, user, etc.) makes a request to access protected content. It is not intended to identify key or critical elements of the disclosure or to delineate the scope of the disclosure. The following summary merely presents some concepts of the disclosure in a simplified form as a prelude to the more detailed description provided below.

As described above, when a client makes a request for a particular item of digital content, the server hosting such content must ensure that the client is entitled to view the content before granting access to the content. To ensure that the client is entitled to view the content, the server must examine certain data associated with the client and with the content. To improve scalability in authorizing a client's request to access protected content, aspects described herein assign responsibility to the client's browser to synchronize and coordinate data lookups associated with the request, rather than relying on the server to do so. Thus, the client's browser/system acts as the mediator (e.g., middleman), thereby alleviating the need for synchronous calls between server-side services. Instead, data necessary for the server to process a client request for accessing protected content may arrive on the incoming request from the client's browser. Such data may include, for example, the user's identity (e.g., email address), the user's IP address, the programs and/or content that the user is subscribed to, the provider of the requested content and the like. As a result, server-side services may render access control decisions in response to client requests for access to protected content without needing to engage in any additional communications (e.g., beyond communications with the client). Relieving a server of such responsibility results, for example, in the server being capable of processing client requests in a rapid, scalable and efficient manner, which generally will allow servers to operate with lower memory requirements and with fewer dependencies on other central processing unit (CPU) resources.

One or more aspects described herein relate to rendering an access control decision based on entitlement data that makes an assertion about a service subscriber's rights. For example, entitlement data may include identification of content items, type of content items, content item providers and the like to which the user is entitled access. Entitlement data may be passed to a content server along with the client's request for access to protected content available through the server. Entitlement data may further make an assertion related to the client's identity (e.g., email address), workstation IP address, and a timestamp used for expiration purposes.

One or more aspects described herein relate to rendering an access control decision based on content metadata that makes an assertion about a particular piece of content. For example, content metadata may include identification of a content item, content provider, availability dates, and the like. Content metadata may be passed to a content server along with the client's request for access to protected content available through the server. Content metadata may further make an assertion related to cache management, such as a timestamp used for expiration purposes.

According to another aspect, entitlement data and/or content metadata may be digitally signed to ensure its authenticity and its origin, and may also be encrypted to prevent unintended recipients from being able to view its contents. Digital signatures allow the recipient of information to verify the identity of the information sender, and also to verify that the information was not altered while in transit.

To ensure that a client's request for protected content is authenticated and authorized, the client's browser may retrieve the client's entitlement data from the client device's cache each time the client makes a request for protected content from a content server. By assigning responsibility for providing entitlement data to the client's browser, the content server is relieved from having to perform entitlement data lookups.

According to another aspect described herein, if the client's entitlement data is not cached in the client device, the client may retrieve the entitlement data from an entitlement data server. The entitlement data server may, in one or more arrangements, respond to the request with the entitlement data stored in a cookie. The cookie may be passed to the client's browser cache for further use. According to one or more aspects, the request for the entitlement data may comprise a redirect from the content server. The request and the redirect may be digitally signed by the content server so that the entitlement server is able to verify the source of the request. This prevents unauthorized devices from accessing entitlement data. To obtain the digitally signed redirect, the client may, in response to determining that the entitlement data is not locally cached, request a redirect from the content server. A token may be used to prove that the subscriber is entitled to receive the redirect. In one or more examples, this token may defend against cross-site request forgery (CSRF).

According to another aspect, content metadata may be passed to a client along with any lists or listing of available content. The lists or listing of available content may be determined or generated based on entitlement data for a subscriber. When the subscriber makes a selection of a particular piece of content, the associated content metadata may then be passed along with the content request to a content server. By assigning responsibility to the client of managing the content metadata, the content server is relieved from having to retrieve the content metadata again before making an access control decision.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

Figure 1:
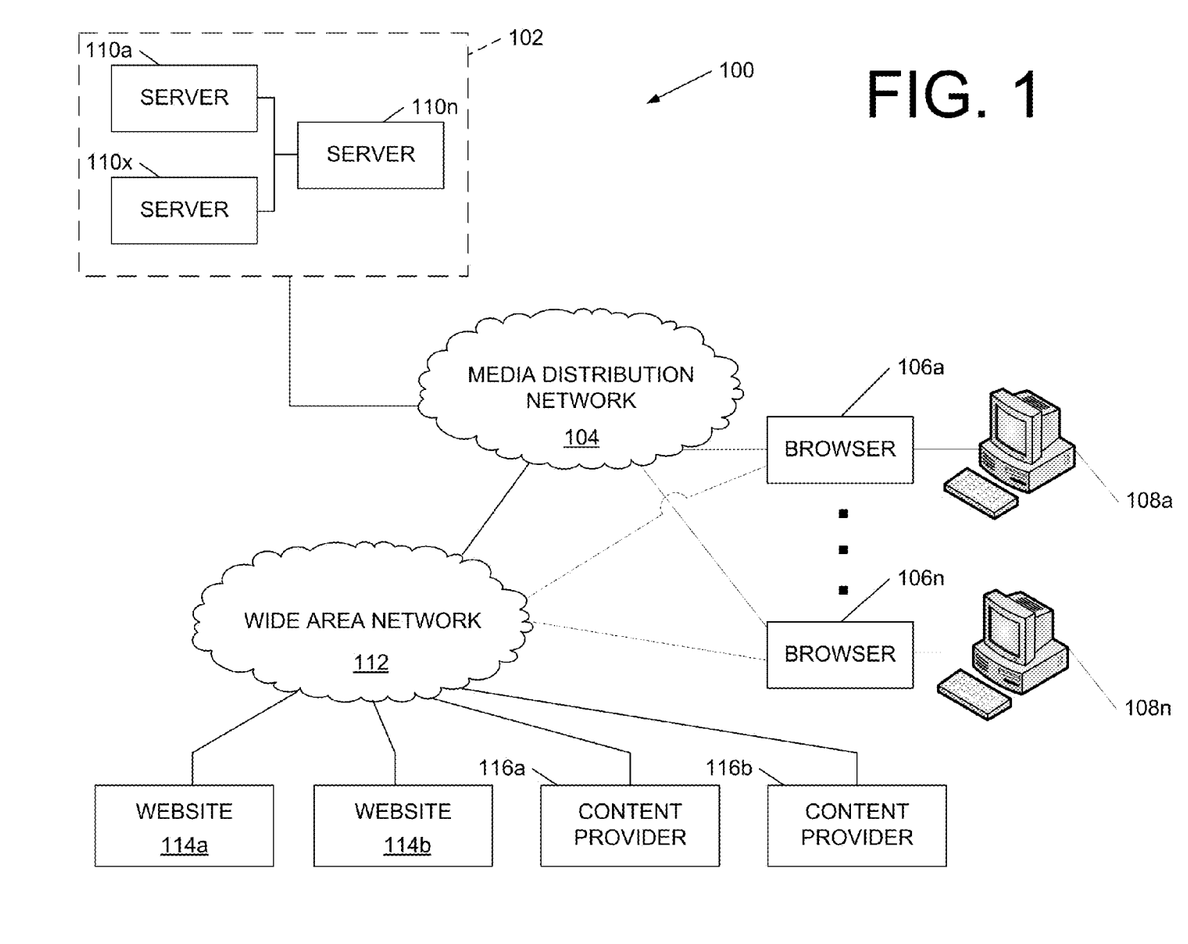
FIG. 1 illustrates an example network environment in which content items may be distributed to subscribing clients according to one or more aspects described herein.

FIG. 1 illustrates a content distribution system 100 that may be used in connection with one or more aspects described herein. The distribution system 100 may include a headend 102, a plurality of browsers 106 (e.g., browsers 106a-106n) contained on and utilized by a corresponding plurality of client devices 108 (e.g., client devices 108a-108n), and a media distribution network 104. The distribution system 100 may be used as a media service and content provider/client system wherein the provider (or vendor) generally operates the headend 102 and the network 104, and the client (i.e., client, customer, service purchaser, user, etc.) generally provides the client device 108 and operates the browser 106 thereon. The client device 108 with corresponding browser 106 is generally located at the client's location such as a client's home, a hotel room, a business, etc. The client device 108 may include, for example, a personal computer, media player, etc.

The headend 102 may include a plurality of devices 110 (e.g., devices 110a-110n) such as data servers, computers, processors, security encryption and decryption apparatuses or systems, and the like configured to provide content (e.g., movies, music, television programming, games, and the like), processing equipment (e.g., provider operated client account processing servers), service transceivers (e.g., transceivers for standard broadcast television and radio, digital television, HDTV, audio, MP3, text messaging, gaming, etc.), and the like. At least one of the devices 110 (e.g., a sender security device 110x), may include a security system.

In one or more embodiments, network 104 may further provide access to a wide area network (WAN) 112 such as the Internet. The physical structures of network 104 may be of any type, such as coaxial cable network, fiber optic cable network, hybrid fiber (coax and fiber) cable network, telephone (land or cellular) network, satellite network, etc.

Accordingly, browser 106 or headend 102 may have access to content and data on the wide area network. Content items may include audio, video, text and/or combinations thereof. In one example, a content and service provider may allow a client to access websites 114 and content provided by content providers 116 connected to the Internet (i.e., WAN 112) using the browser 106. Websites 114 may include television show description sites, movie review sites, news webpages and the like. In another example, a service provider (e.g., a media provider) may supplement or customize media data sent to a client's browser 106 using data from the WAN 112.

Figure 2:
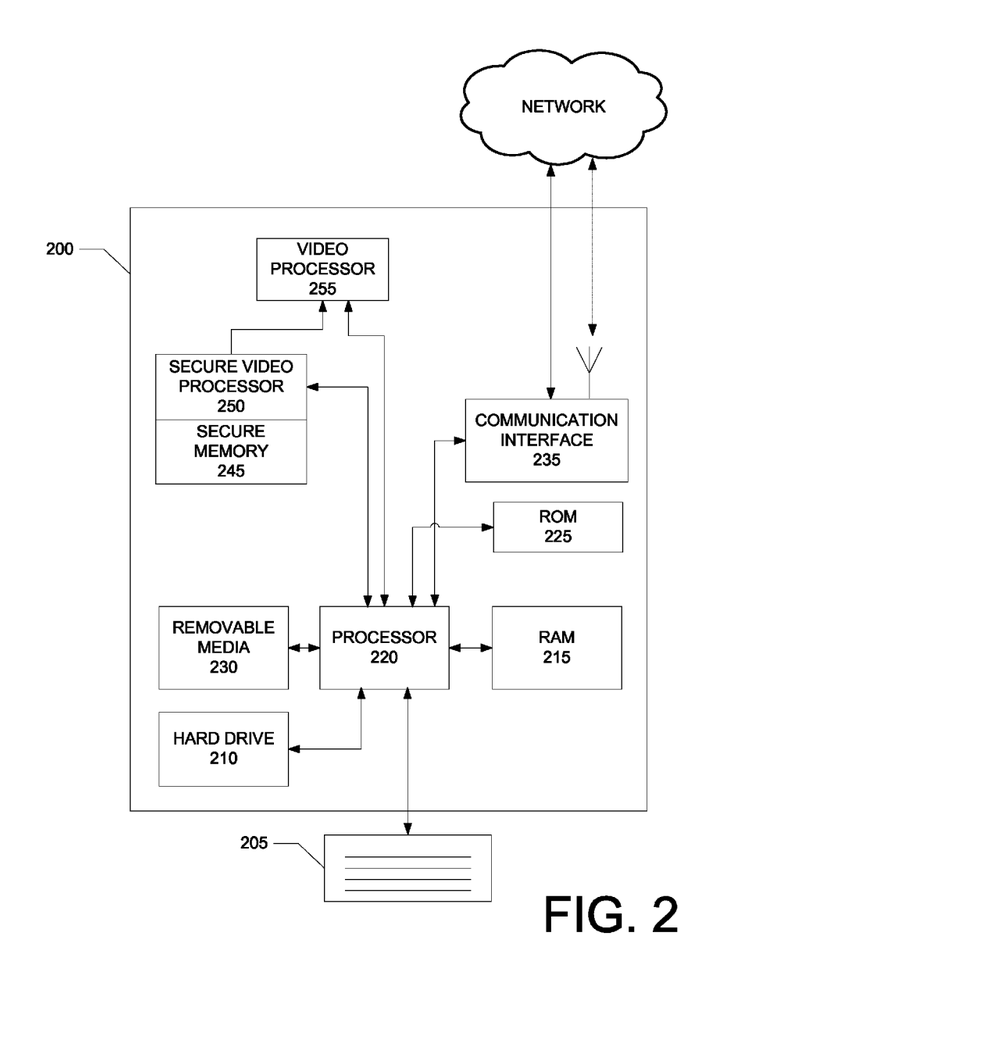
FIG. 2 illustrates a block diagram of a computing system that may be used according to one or more aspects described herein.

FIG. 2 illustrates example components of a computing system, such as server 110a or client device 108a. A computing system may include a housing 200 for various internal components, and may also include various client input devices 205, such as a keyboard, mouse, touch screen or touch pad input, etc. Additional output devices, such as an audio output device (such as speakers, headphones, etc.—not illustrated) may also be included.

The example illustrated in FIG. 2 is, of course, merely an example, and other configurations (e.g., having more or fewer components, duplicate/combined components, etc.) may be used for the computing system. Additionally, the configuration shown in FIG. 2 may also be used to implement any of the other components described herein, with computer-executable instructions stored on memory (e.g., hard drive 210, RAM 215, etc.) that, when executed by a processor (e.g., processor 220), cause the component to perform as described herein.

The computing system may include one or more processors 220, which may be a microprocessor of programmable logic circuit configured to execute instructions to perform the various features described herein. Those instructions may be stored, for example, on an internal read-only memory (ROM) 225, which may contain the built-in operating system (BIOS) for the computing system. The instructions may also be stored in other areas of memory as well, such as a hard drive 210, removable media 230 (e.g., floppy disk, FLASH drive, CD-ROM, DVD-ROM, etc.), or even in random-access memory (RAM) 215. Storage in hard drive 210 may be configured to store a variety of information such as application data, user preference information, content items, broadcast listings, media recording schedules, application programming and the like.

The computing system may also include a communication interface 235, which may include any desired type of hardware and/or software interface configured to communicate with other devices, e.g. over a network such as network 104. For example, communication interface 235 may include any appropriate hard-wired (e.g., twisted pair, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application and/or network. As another example, communication interface 235 may be a USB port. Communication interface 235, in one or more arrangements, may include a network interface circuit, which may be used to communicate with any desired external network. Such a network interface circuit may include a local wireless network interface, such as for a WiMAX network, BLUETOOTH network, an ANSI 802.11x network, or any other local wireless network, and may include one or more wireless antennas. The network interface circuit may also support longer-range wireless networking, such as cellular telephone wireless networks, satellite, etc. Communication interface 235 and network interface circuit thereof need not be limited to wireless networks, and may alternatively include support for wired networks as well, such as Ethernet, cable television, etc.

The computing system may also include a video processor 255, which may be any desired type of processor or circuit that supplies a client device, such as client device 108a, with images to show a user. For example, a video processor 255 may be a video graphics card. The video processor 255 may include any desired type of hardware and/or software configuration to receive, decode and display video data received from a network (which may be processed by other devices, such as a communication interface 235 and/or a processor 220 first.

The computing system may also include a secure video processor 250 and secure memory 245. Data received and/or processed by secure video processor 250 may be stored in secure memory 245. The secure video processor 250 may include additional hardware and/or software to handle the reception, decrypting, decoding and/or display of video data that has been secured in a particular manner. For example, some incoming streams of video data (e.g., a stream of a movie available only under a certain subscription plan) may be encrypted, and the secure video processor 250 may be configured to handle the decryption of that incoming data stream. Such incoming encrypted data streams may be decrypted within secure video processor 250, and the resulting decrypted stream may be supplied to the video processor 255 for output on, for example, client device 108a.

Figure 3:
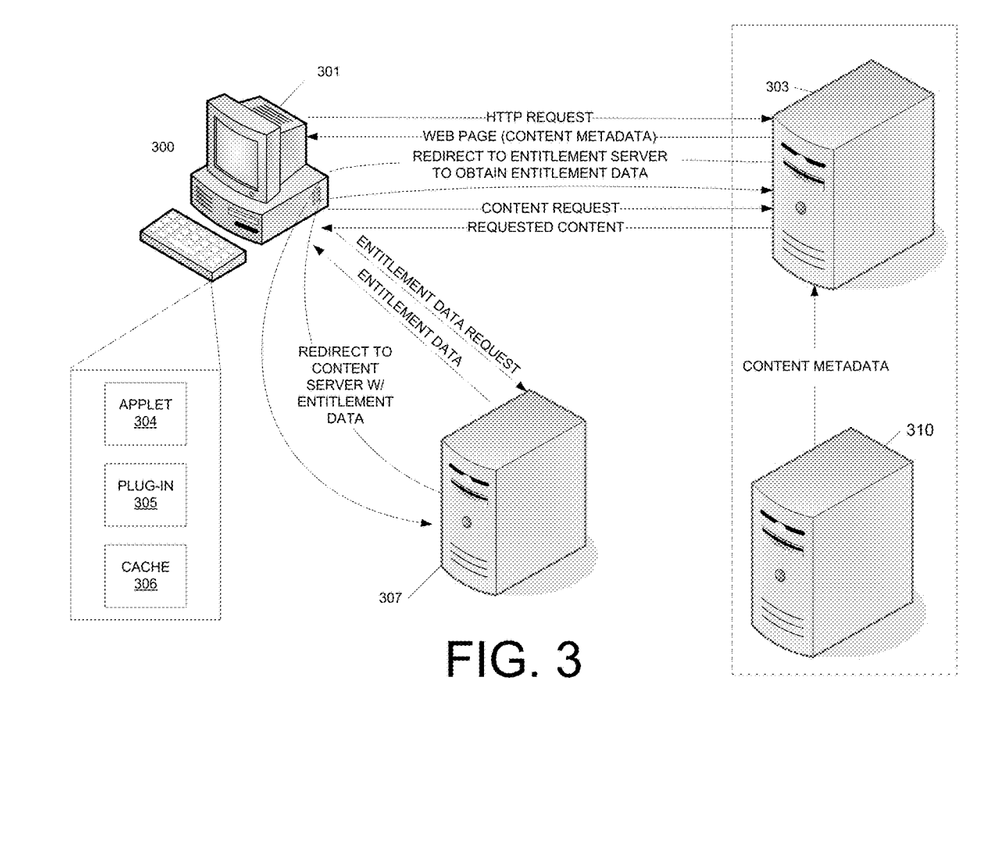
FIG. 3 illustrates a data flow for requesting access to protected content according to one or more aspects of the present disclosure.

FIG. 3 illustrates a data flow for requesting access to protected content. The protected content may be content (e.g., audio, video, text and/or combinations thereof) on a server that might only be accessed by an authorized and authenticated subscriber or client. As illustrated, a client at client system 300 may wish to access protected content located on content server 303 through browser 301 operating on client system 300. The client may seek access to the protected content on content server 303 over a network such as the Internet. From content server 303, the client may receive programs executable by browser 301, such as Java Applets, JavaScript, and Flash. For example, the client may receive an applet 304, which generally refers to an application that performs a specific task, such as installing a plug-in within the context of a larger program, and may be used to provide interactive features to web applications that other languages or protocols, such as HTML, are unable to provide. As described above, applet 304 may be, for example, a Java Applet that can be embedded in a web page of a site hosted by content server 303. In one example, applet 304 installs plug-in 305 to perform client-side processes on behalf of content server 303. Plug-in 305 may be, for example, software that is added to browser 301 in order to enhance the browser's capability, e.g., to process entitlement information and/or to enable browser 301 to support different types of digital content (video, audio, etc.). Additionally, browser 301 may include cache 306, in which a client's entitlement data is stored.

Furthermore, content server 303 may retrieve content metadata from a content metadata server (e.g., server 310) to determine certain attributes of a content item or items. Thus, in one example, in response to a client request to the content server to determine available content, content server 303 may retrieve content metadata from content metadata server 310 and embed it in the response to the client. In one or more arrangements, content metadata server 310 may comprise a database within server 303. Additionally or alternatively, content metadata may be cached in the content server 303.

A user of client system 300 that requests access to protected content on content server 303 provides entitlement data and the appropriate content metadata (e.g., metadata corresponding to the requested protected content) along with the request for the protected content. Entitlement data may be cached in client system 300 and may include, for example, identification information of a user or subscriber of client system 300 (e.g., email address, name, subscriber identification number), the IP address of client system 300, the user's subscription entitlements, a timestamp for expiration, and/or a digital signature by entitlement server 307 from which the entitlement data was passed. Content metadata is available from the client's previous request context and may include, for example, content identification number, content provider, availability dates, a timestamp for expiration, a digital signature by the content server 303 through which the previous request context was delivered, and/or a digital signature by the content metadata server 310 from which the content metadata was retrieved.

In some instances, entitlement data might not exist in cache 306 of client system 300. Therefore, client system 300 may need to request entitlement data from entitlement server 307, which may be in a different domain than content server 303. When client system 300 makes a request for protected content from content server 303, without having entitlement data stored in cache 306 of client system 300, client 300 may be redirected by content server 303 to request entitlement data from entitlement server 307. As described in further detail below, the redirect may be digitally signed to verify authenticity. If entitlement server 307 accepts the redirect request from content server 303, and finds the entitlement data requested by client system 300, entitlement server 307 may then issue a redirect to content server 303 with the entitlement data. If content server 303 accepts the redirect from entitlement server 307, content server 303 may then return the entitlement data to the client system 300, which may then make a request for content to content server 303, including the entitlement data and/or content metadata in the request. The content server 303 may then determine if the client 300 is authorized to receive the requested content item and if so, provide client 300 with access to the content. Alternatively or additionally, if content server 303 and entitlement server 307 are in the same domain, client 300 may request entitlement data from server 307 without requesting a redirect from content server 303.

Figure 4A:
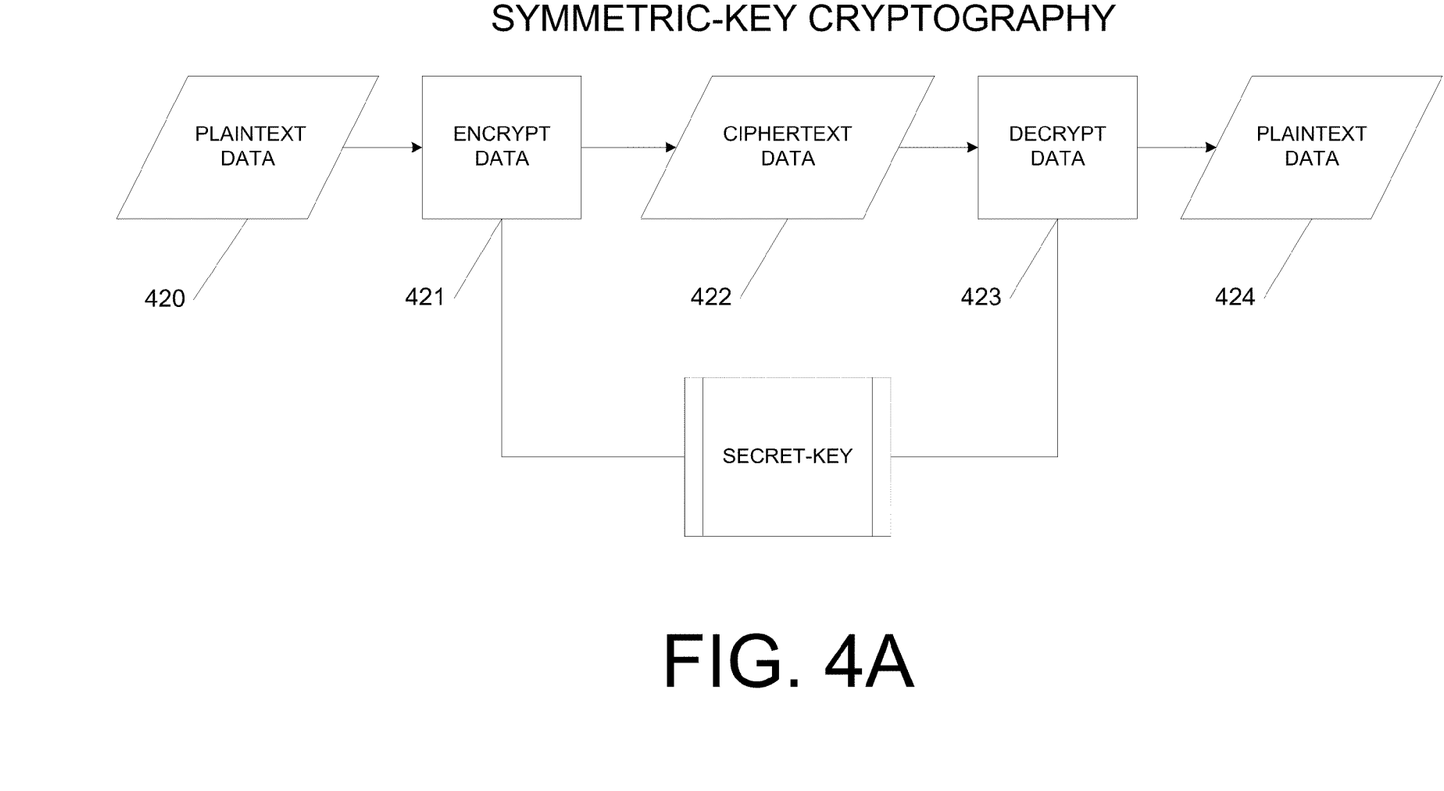
FIG. 4A is a flowchart illustrating an example framework underlying the method of transmitting entitlement data across domains.
Figure 4B:
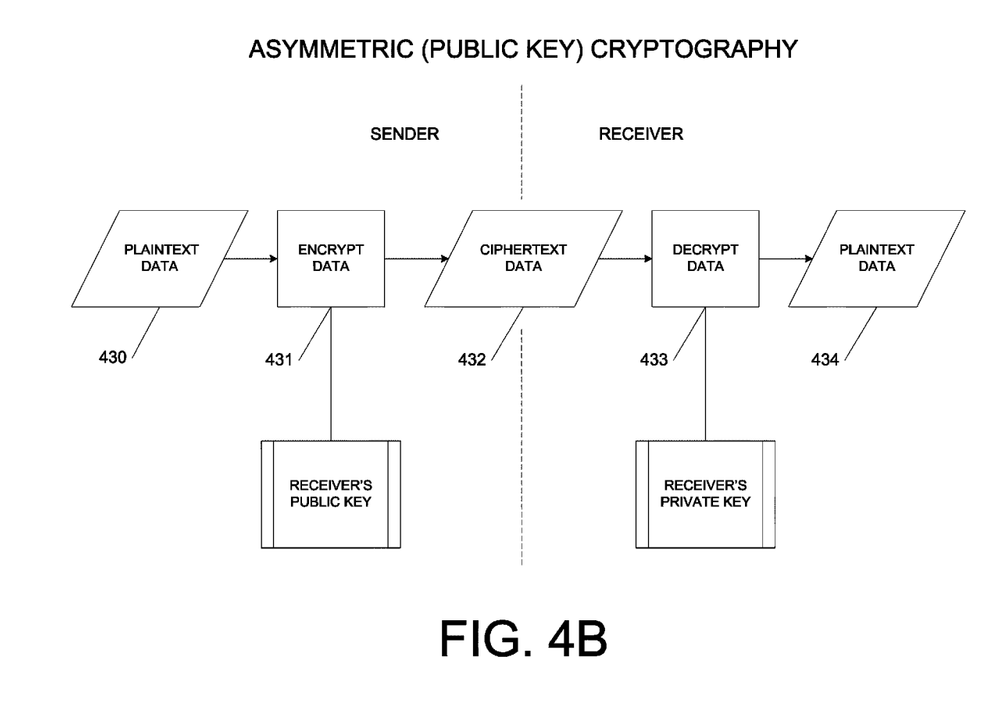
FIG. 4B is a flowchart illustrating an example framework underlying the method of transmitting entitlement data across domains.

FIGS. 4A and 4B are flowcharts that illustrate example frameworks underlying the method of transmitting entitlement data across domains. Transmitting entitlement data from one domain to another generally requires establishing a trust relationship between the domains. One example of how a trust relationship may be established between domains is through symmetric-key cryptography. The process of encrypting and decrypting data through symmetric-key cryptography is illustrated in FIG. 4A. At step 420, data that is to be sent exists in plaintext or cleartext, which means, for example, the data has not been encrypted and is readable without additional processing of the information. For example, plaintext data may be a list of subscription services to which a client is entitled to access. At step 421, the data in plaintext is encrypted before it is sent. Encryption involves executing a mathematical function on plaintext data, in combination with a secret key, to disguise the data in such a way as to hide its actual substance. Encryption is used to make sure that information remains hidden from unintended recipients, even those who are able to view the encrypted data. For example, a list of client entitlements may be encrypted by substituting different information, according to a particular secret key (e.g., word, number, phrase), for the information that is actually contained in the list of entitlements. At step 422, the encrypted data, which is known as ciphertext, is sent to a recipient. At step 423, the data in ciphertext undergoes decryption, which is the process of reverting ciphertext to its original plaintext format, through use of the same substitution pattern and secret key, in a manner that allows only the intended recipient to read the information. For example, the information originally contained in the aforementioned list of client entitlements replaces the unreadable information that had previously been substituted. At step 424, the data is read in plaintext by the intended recipient.

Transmitting entitlement data from one domain to another may also be accomplished by establishing a trust relationship between the domains through asymmetric (public key) cryptography. The process of encrypting and decrypting data through asymmetric (public key) cryptography is illustrated in FIG. 4B. Asymmetric cryptography uses a pair of algorithm keys to encrypt and decrypt data such that it may be transmitted securely with only the intended recipient being able to view the data. In one or more arrangements, encryption may include PGP encryption. At step 430, data that is to be sent exists in plaintext or cleartext, and the intended recipient already possesses a public and private key pair, the public key being maintained by a public administrator. At step 431, the data in plaintext is encrypted by the sender before it is sent by using the intended recipient's public key that the sender may obtain, for example, from the public administrator. In step 432, the encrypted data, which again exists as ciphertext, is transmitted to the intended recipient. At step 433, when the recipient receives the ciphertext data, the recipient may decrypt the data with the private key that only the recipient has access to. Then at step 434, the recipient is able to view the data in plaintext, as it was originally sent.

Figure 5:
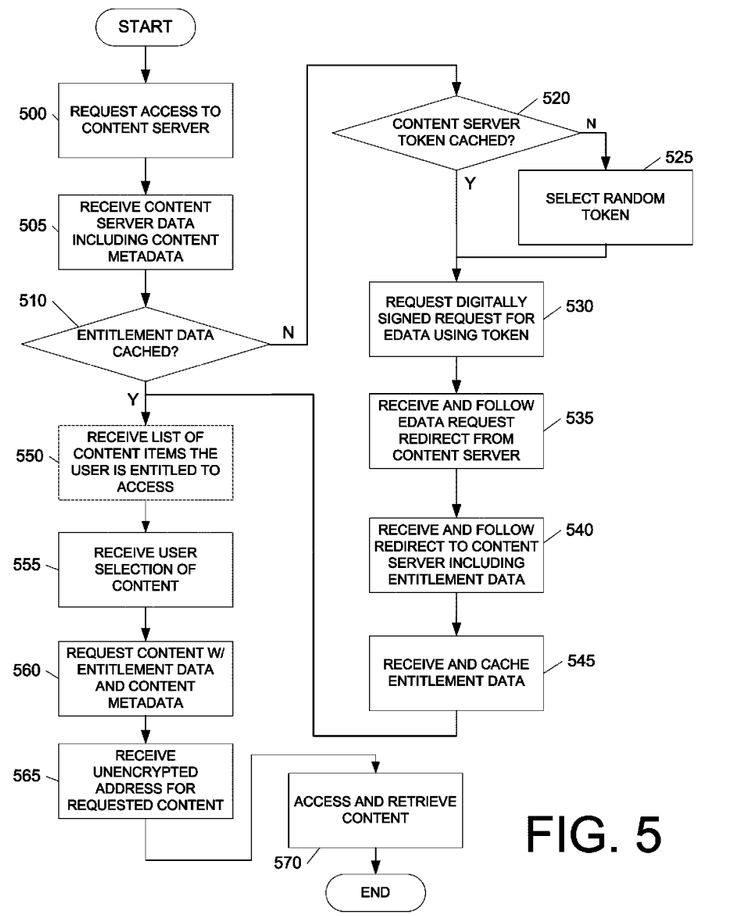
FIG. 5 is a flowchart illustrating a method by which a client system may request and access content from a content server by providing entitlement data.

FIG. 5 illustrates a method by which a client system may request and access content from a content server by providing entitlement data. In step 500, the client system may request access to a content server. For example, the client system may receive, through a browser application, a network address corresponding to a content server site. The browser application may be, for example, a web browser such as MICROSOFT INTERNET EXPLORER, MOZILLA FIREFOX and the like. In step 505, the client may receive content server data in response to the request. The content server data may include a website, a listing of content available on the content server, content item metadata, web applications (e.g., applets) and/or combinations thereof. In one or more arrangements, content metadata may be unique to the requesting client system. As further explained herein with reference to FIG. 6, content metadata may be used to annotate each video in a listing of videos provided to the client system in response to a request for access to the content server. For example, the content metadata may identify that a particular item of video content is provided by a particular content provider. In one or more arrangements, the web applications may comprise Java Applets. The application through which the content server data was requested may be configured to render and/or execute the data received in response to the request.

Figure 6:
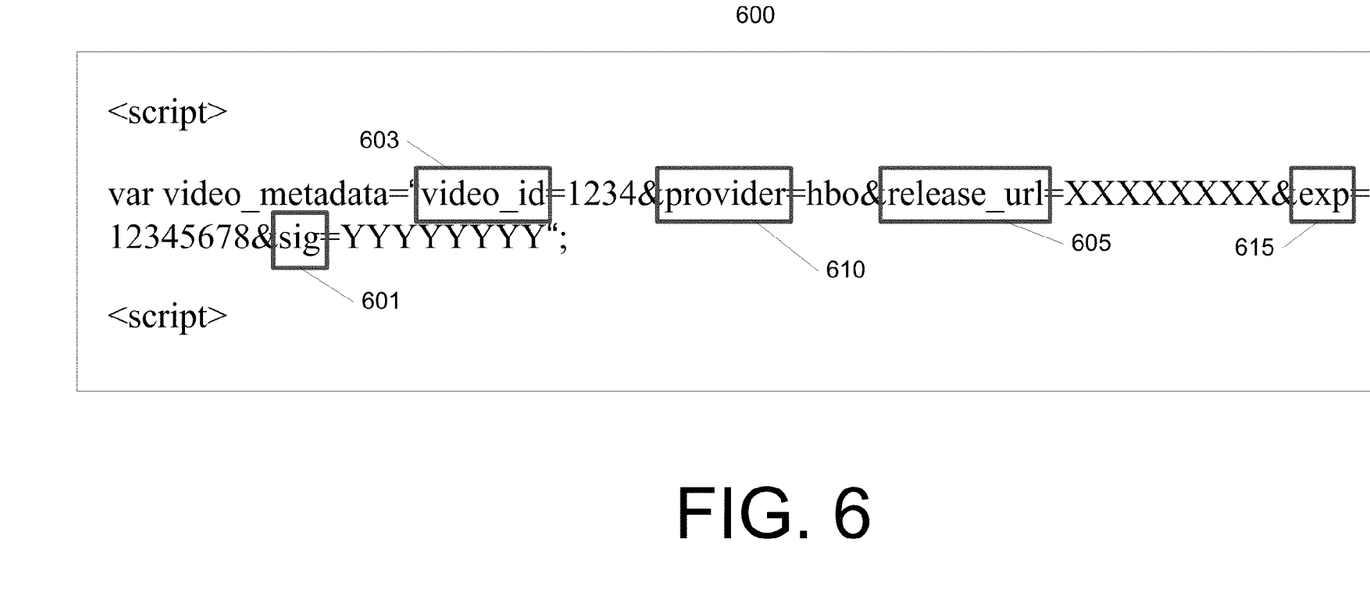
FIG. 6 illustrates an example of content metadata according to one or more aspects described herein.

FIG. 6 illustrates an example of content metadata that may be embedded in the content server data received by the client system from the content server in step 505. Digital signature (i.e., sig) parameter 601 of content metadata 600 represents a digital signature by the content server (e.g., content server 303 of FIG. 3). The digital signature verifies to other entities, domains or servers that a request or data transmitted is authorized by the signing entity. For example, including digital signature 601 with a content request ensures that when the content server receives the request, the content server is able to authenticate the request. Release URL parameter 605 may comprise an encrypted version of a true address for a content item. A true address may be a location at which a content item is stored and accessible. In some arrangements, a client browser may initially have knowledge of and access a pseudo-address for a content item. The pseudo-address is generally not where the content item is stored. Instead, the pseudo-address references a location where authentication processes are invoked to verify the requesting client or user prior to revealing the content item's true address (i.e., Release_URL 605) and allowing the client browser to access the content item. The requested content item, on the other hand, may be identified in content id (i.e., video_id) parameter 603. Content id parameter 603 may include, for instance, an identifier assigned to the content item by the content server.

Provider parameter 610 may be passed in cleartext to the client (and over the network), so that a determination may be made as to whether the client is entitled to view the content. For example, if provider parameter 610 corresponds to "HBO," a client system may determine whether the user has subscribed to HBO using the entitlement data. If not, the request for the HBO content may be denied or the content may not be offered to the client system in the first place, and thus a request for such content is not made. Further, expiration time parameter (i.e., exp) 615 may be used to indicate a time that digital signature 601 will expire or become invalid. Upon expiration of digital signature 601, the signature might not be recognized by a content server or entitlement data server as a valid signature. Expiration parameter time 615 may be expressed in terms of second, minutes, hours, days, weeks, months and the like.

With further reference to FIG. 5, in step 510, the client system or an applet executing thereon may determine whether entitlement data relevant to the content items available through the content server is cached in the client system. The entitlement data may include information regarding the subscriptions and/or rights the client has with respect to content items available on the content server.

If entitlement data is not cached at the client, the client may determine if a content server token is cached in step 520. A content server token generally refers to a key or identifier that is issued by the content server as a way to verify that transmitted data and/or requests are authorized by the content server. In one or more arrangements, the token may comprise a CSRF token (i.e., a token used to defend against CSRF). If a content server token is not cached, the client may select a random token in step 525. Additionally, the client may notify the content server of the token selected.

Once the token is retrieved and/or set, the client may request, from the content server, a digitally signed redirect for requesting entitlement data from an entitlement server in step 530. The request for the digitally signed redirect may be appended with or include the token. The token allows the content server to verify that the request is received from and the redirect is being provided to an authorized source. Similarly, the request for entitlement data may be required to be digitally signed by the content server so that the entitlement data server does not distribute entitlement data to unverified or unauthorized entities (e.g., hackers). The content server and the entitlement data server may also be on the same domain, in which case the aforementioned redirect might not be required. For example, if the content server and entitlement data server are on the same domain, the client may make a request for entitlement data directly to the entitlement data server, rather than the client's request reaching the entitlement data server through a redirect issued by the content server.

In step 535, the client may receive and follow the digitally signed redirect received from the content server. The redirect is configured to direct the client browser or applet to an entitlement data server storing entitlement data for the client. The redirect may further include a request for the entitlement data. Accordingly, instead of retrieving the entitlement data from the entitlement data server, the content server uses the client as an intermediary or mediator so that the content server does not need to communicate with the entitlement data server. In response to the request for the entitlement data included in the digitally signed redirect, the client may receive and follow another redirect in step 540. This subsequent redirect may be directed back to the content server for requesting the content item. For example, the redirect to the content server may include a request for the content item including the entitlement data. Additionally, the client may cache the received entitlement data in step 545.

If entitlement data is cached at the client system or once the entitlement data has been retrieved from an entitlement data server, the client may optionally receive a list of content items that the user is entitled to access in step 550. The list may be generated by the client by comparing the entitlement data with content metadata of content items available at the content server. Alternatively or additionally, the list may be generated by the server based on the entitlement data and provided to the client system. In step 555, the client may subsequently receive a user selection of a content item. The client may then transmit a request for the selected content item to the content server in step 560. The request may include the entitlement data and content metadata to prove that the client has a right to access the content item. In one or more arrangements, a request for content may include the pressing of a play button displayed alongside or within a content item. Once the request for the content item has been sent to the content server with the entitlement data and content metadata, the client may receive an address or location information for the content item in step 565. In one arrangement, the address may correspond to an unencrypted version of an address specified in the content item request script. In step 570, the client may use the address to access, retrieve (e.g., download/stream) and render the content item from the content server.

Figure 7:
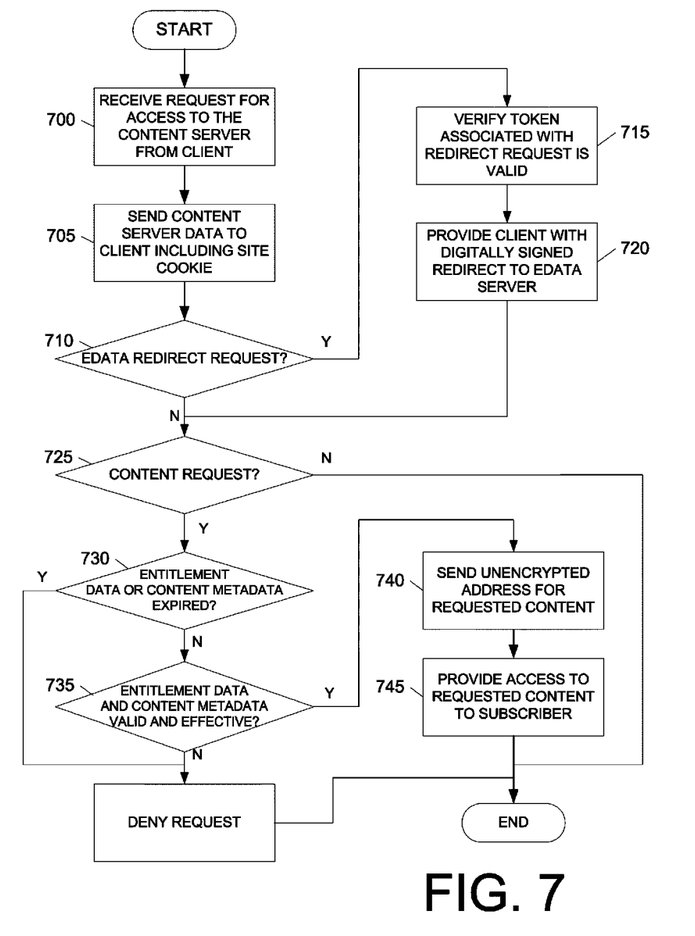
FIG. 7 is a flowchart illustrating a method for processing content requests by a content server based on entitlement data.

FIG. 7 illustrates a method for processing content requests by a content server based on entitlement data. In step 700, for example, the content server may receive a request for access to the content server from a client device or system. The request may include login credentials if the user is required to login to access information provided on the content server (e.g., videos, text, audio and other content items). In one or more arrangements, login credentials might not be needed. In step 705, the content server may transmit content server data to the client in response to the request. The content server data may include a cookie that stores server-specific information such as an identifier (e.g., URL), a content server specific token, user information and the like. The content server data may further include a webpage, applets, audio, video, text, content metadata and the like. In one example, the content server may provide an applet or other executable content (e.g. scripts, Flash applications, and the like) for execution on the client system. The applet may act as an interface between the client system and the content server. Thus, data requests (e.g., content and entitlement data) and content received from the content server may be processed through the applet. In another example, the content server may retrieve content metadata for content items available therethrough from a content metadata server or a local database.

In step 710, the content server may determine if an entitlement data redirect request has been received. As noted herein, clients may be required to request an entitlement data redirect if the client does not have the entitlement data cached and so that entitlement data is only provided to authorized requestors. By requesting the redirect from the content server, a client may prove that it is an authorized requestor. If an entitlement data redirect request is received, the content server may verify that a token appended to the request is valid in step 715. For example, the content server may determine whether the token matches the content server specific token that is issued by the content server to authorized clients/subscribers upon accessing the server. Alternatively, the token may be client generated, in which case the content server may verify that the token appended to the request matches a client generated token of which it was previously notified. Once the token and request has been verified, the content server may provide the client with a digitally signed redirect to an entitlement data server in 720. The redirect may correspond to a request for entitlement data form the entitlement data server and may include a signature or key that is unique to the content server. Accordingly, a request or other data may be signed with the signature or key to prove that the request originated or is authorized by the content server.

In step 725, the content server may receive a content request including content metadata. The content request may comprise a redirect from the entitlement data server or may be a request originating (i.e., non-redirect) from the client if the client has entitlement data already cached. In step 730, the content server may verify that the entitlement data and content metadata are not expired. That is, in some arrangements, entitlement data may expire so that changes to the user's entitlement are accurately and timely reflected in the entitlement data; similarly content metadata may expire so that changes to the content's attributes are accurately and timely reflected in the content metadata. The expiration may be stored in the entitlement data and/or content metadata as a specific expiration time or date or as a length of time in addition to a start time or date.

If the entitlement data and content metadata have not expired, the content server may subsequently compare the entitlement data and content metadata to determine if the requesting subscriber is entitled to access the requested content item in step 735. For example, if the content metadata specifies that the provider of the content was a particular provider such as HBO or SHOWTIME, the content server may determine if the entitlement data specifies that the user has a subscription to that content. Alternatively or additionally, the entitlement data may specify a type of content that the user is entitled to access such as comedies, sitcoms, dramas, television shows, movies and the like. In yet another example, entitlement data may specify that the user has access to content of a certain quality (e.g., high definition, high resolution, standard definition) or of a certain length (e.g., all videos under 5 minutes long). Other types of entitlement specifications may be used as well. The content server may further determine whether the user information included in the entitlement data matches the user or subscriber information in a content server cookie cached in the subscriber's browser. A subscriber's login information may be stored in a cookie upon login.

If the entitlement data is valid for the requesting subscriber and is effective for the requested content item (i.e., provides access for the requested content item), the content server may transmit an unencrypted address for the content item to the subscriber in step 740. In one example, the subscriber's content request (e.g., content metadata 600 of FIG. 6) may include an encrypted address 605 (FIG. 6) of the content item. Accordingly, the content server may decrypt this address and reveal it to the subscriber's applet or browser. In step 745, the content server may provide the requested content item to the subscriber, e.g., in response to the client's browser or applet accessing the unencrypted address.

Figure 8:
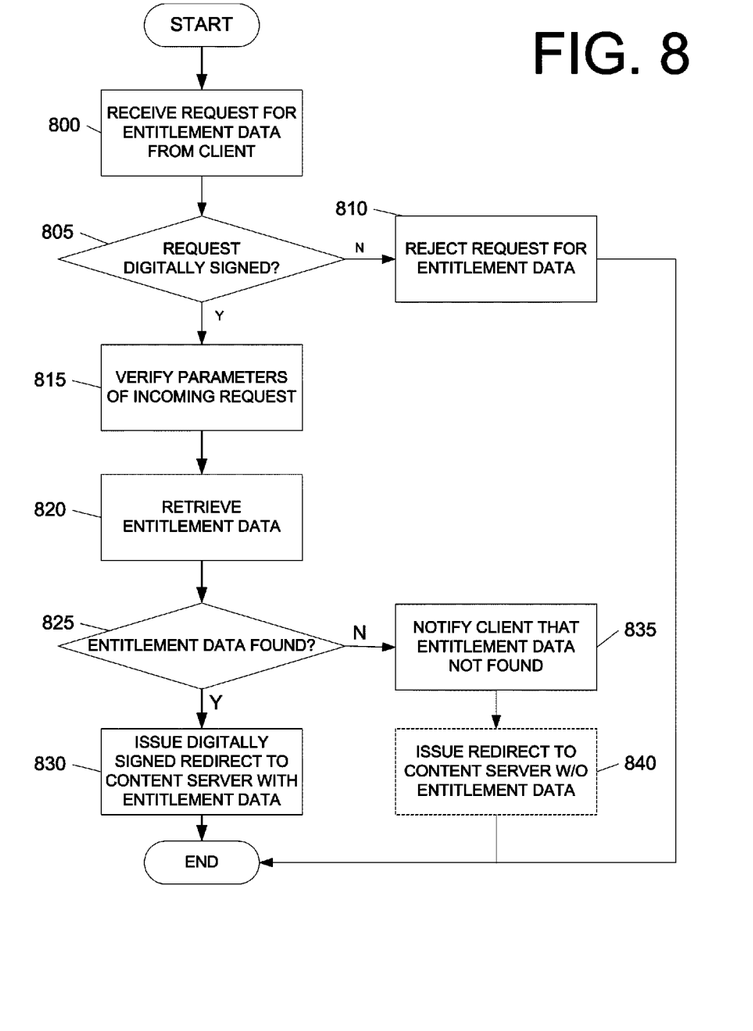
FIG. 8 is a flowchart illustrating a method by which an entitlement server may provide entitlement data to a client system so that the client system is able to retrieve protected content items.

FIG. 8 illustrates a method by which an entitlement server may provide entitlement data to a client system so that the client system is able to retrieve protected content items. In step 800, the entitlement server may receive a request for entitlement data from the client system. Recall from FIG. 7, for example, that this request from the client system may be in the form of a digitally signed redirect provided to the client system by the content server. In step 805, the entitlement server may check that the request is digitally signed by the content server. For example, checking that the request is digitally signed by the content server ensures that the request was authorized by the content server, thus also ensuring the entitlement data server does not distribute entitlement data to unverified or unauthorized entities. The digital signature may comprise a series of bits, characters and/or numbers appended or otherwise included in the request redirect string. If the request is not digitally signed by the content server, then in step 810 the entitlement server rejects the request for entitlement data and the routine may end.

If, in step 805, it is determined that the request is digitally signed by the content server, then the entitlement server may verify the parameters of the request in step 815. For example, the entitlement server may examine the expiration parameter of the request to ensure that the digital signature has not expired, and is thus a valid signature. There can be any number of parameters of the incoming request that the entitlement server verifies in addition to, or instead of, the expiration parameter. Further, the parameters may be examined in any number of alternative ways by the entitlement server. If the entitlement server verifies the parameters of the incoming request, then in step 820, the entitlement server may attempt to retrieve the requested entitlement data. For example, the entitlement server may read a login cookie stored on the client system and extract a user's identity. A login cookie may contain, for example, login information that was submitted by a user to a content provider upon logging into a site corresponding to the content provider. After extracting the user's identity information, an entitlement server web application may then determine if a database has entitlement data for the user based on the user's identity information. The entitlement server may also attempt to retrieve entitlement data in alternative ways in addition to those described above.

If entitlement data is found by the entitlement server in step 825, then in step 830 the entitlement server may issue a digitally signed redirect to the content server for the client to follow. The digitally signed redirect may pass to the content server the entitlement data found by the entitlement server. The entitlement data may, in one or more examples, be passed as a cookie through the client's browser. Including a digital signature with the entitlement data in step 830 ensures that when the content server receives the entitlement data, the content server is able to authenticate that the data came from the entitlement server. The entitlement data passed from the entitlement server to the content server in the digitally signed redirect may include all or part of the entitlement data that was requested by the client system in step 800. For example, if a client's subscription plan is being processed or is otherwise unavailable, in whole or in part, then data associated with the client's plan might not be included in the entitlement data passed to the content server, even if such data was included in the request from the client system. In some arrangements, only entitlement data relevant to the requested content item may be provided in the redirect.

If no entitlement data is found at step 825, then the entitlement server may send to the client system a notification that no entitlement data was found at step 835. For example, JavaScript running on the entitlement server may execute script for generating a pop-up notification on the browser of the client system, informing the client system that no entitlement data was found in response to the request. Optionally, at step 840, the entitlement server may further issue a redirect to the content server without entitlement data.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having logic gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

I claim:

1. A method comprising:
   receiving, by a client device, content data comprising an encrypted version of a location of one or more content items;
   requesting, by the client device from a content server, an entitlement data redirect to an entitlement server;
   receiving and following, by the client device, the entitlement data redirect to the entitlement server to obtain entitlement data for the client device or a user of the client device;
   transmitting, by the client device, the entitlement data for at least one of: the client device and the user of the client device, to the content server in association with a request for a content item of the one or more content items, wherein the entitlement data authorizes the at least one of: the client device and the user to access the content item;
   after transmitting the entitlement data to the content server, receiving, by the client device, an unencrypted version of a location of the content item from the content server; and
   retrieving, by the client device, the content item from the content server based on the unencrypted version of the location of the content item.

2. The method of claim 1, further comprising:
   transmitting the content data to the content server in association with requesting the content item.

3. The method of claim 1, wherein the entitlement data redirect request includes a request for a digitally signed redirect to the entitlement server from the content server.

4. The method of claim 3, further comprising:
   receiving, from the content server, the digitally signed redirect by the client device.

5. The method of claim 2, wherein the content data comprises an electronic signature of the content server and an encrypted address of the content item.

6. The method of claim 5, wherein the content data further includes an expiration time for the electronic signature.

7. The method of claim 5, further comprising receiving an applet configured to execute on the client device and interface with the content server.

8. An apparatus comprising: a processor; and memory operatively coupled to the processor and storing computer readable instructions that, when executed, cause the apparatus to: receive content data including an encrypted version of a location of one or more content items; request a redirect to an entitlement data server from a content server; receive and follow the redirect from the content server; receive and follow a redirect from the entitlement data server to the content server, the redirect to the content server including entitlement data for at least one of: the apparatus or a user of the apparatus; transmit the entitlement data for the at least one of: the apparatus and the user of the apparatus to the content server in association with requesting a content item of the one or more content items, wherein the entitlement data authorizes the at least one of: the apparatus and the user to access the content item; and after transmitting the entitlement data to the content server, receive an unencrypted version of a location of the content item from the content server; and retrieve the content item from the content server based on the unencrypted version of the location of the content item.

9. The apparatus of claim 8, wherein the entitlement data specifies one or more content providers for which the user is allowed access.

10. The apparatus of claim 8, wherein the computer readable instructions, when executed, further cause the apparatus to:
    request access to a network page of the content server; and
    receive data for the network page including a token and the content data, wherein the token is configured to verify authorization of the apparatus to receive data from the content server.

11. The apparatus of claim 8, wherein the computer readable instructions, when executed, further cause the apparatus to:
    determine whether the entitlement data is cached in the apparatus;
    in response to determining that the entitlement data is cached in the apparatus, send a request including the entitlement data for the content item to the content server, the request further comprising content data for the content item; and
    receive an address for the content item from the content server in response to the request for the content item.

12. The apparatus of claim 11, wherein the content data comprises an electronic signature of the content server and an encrypted address of the content item.

13. The apparatus of claim 12, wherein the content data further comprises an expiration time for the electronic signature.

14. A non-transitory computer readable medium storing computer readable instructions that, when executed, cause an apparatus to: receive content data including an encrypted version of a location of a content item; request a redirect to an entitlement data server from a content server storing the content item, wherein the entitlement data server is different from the content server; receive and follow the redirect from the content server, wherein the redirect is digitally signed by the content server; transmit entitlement data for the apparatus or a user of the apparatus to the content server in association with requesting the content item stored in the content server, wherein the entitlement data authorizes the user to access the content item; and after transmitting the entitlement data to the content server, receive an unencrypted version of the location of the content item from the content server; and retrieve the content item from the content server based on the unencrypted version of the location of the content item.

15. The computer readable medium of claim 14, wherein the computer readable instructions, when executed, further cause the apparatus to:
    request access to a network page of the content server; and
    receive data for the network page including a token configured to verify authorization of the apparatus to receive data from the content server.

16. The computer readable medium of claim 14, wherein the entitlement data specifies an expiration time of the entitlement data.

17. The computer readable medium of claim 14, wherein the entitlement data server resides on a first network domain and the content server resides on a second network domain different from the first network domain.

18. A method comprising: transmitting, by a content server to a client device, content data including an encrypted version of a location of a content item; receiving, by the content server, a request for the content item from the client device, the request comprising a request for an entitlement data redirect; providing, by the content server, the client device with the entitlement data redirect configured to redirect the client device to an entitlement server storing entitlement data for at least one of: the client device and a user of the client device; receiving entitlement data for the at least one of: the client device and the user of the client device at the content server; and after receiving the entitlement data, transmitting an unencrypted version of the location of the content item to the client device, the unencrypted version of the location of the content item allowing the client device access to the content item in association with receiving the request for the content item.

19. The method of claim 18, further comprising:
receiving, at the content server, content data corresponding to one or more content items in association with receiving the request for the content item.

20. The method of claim 18, wherein the entitlement data is requested from the entitlement server different from the content server when the entitlement data is not cached at the client device,
wherein the entitlement data redirect is a digitally signed redirect to the entitlement server at the content server.

* * * * *